K. E. PEILER.
GLASS CONVEYING APPARATUS.
APPLICATION FILED MAR. 20, 1915. RENEWED JULY 18, 1917.
1,379,593.
Patented May 24, 1921.
5 SHEETS—SHEET 1.
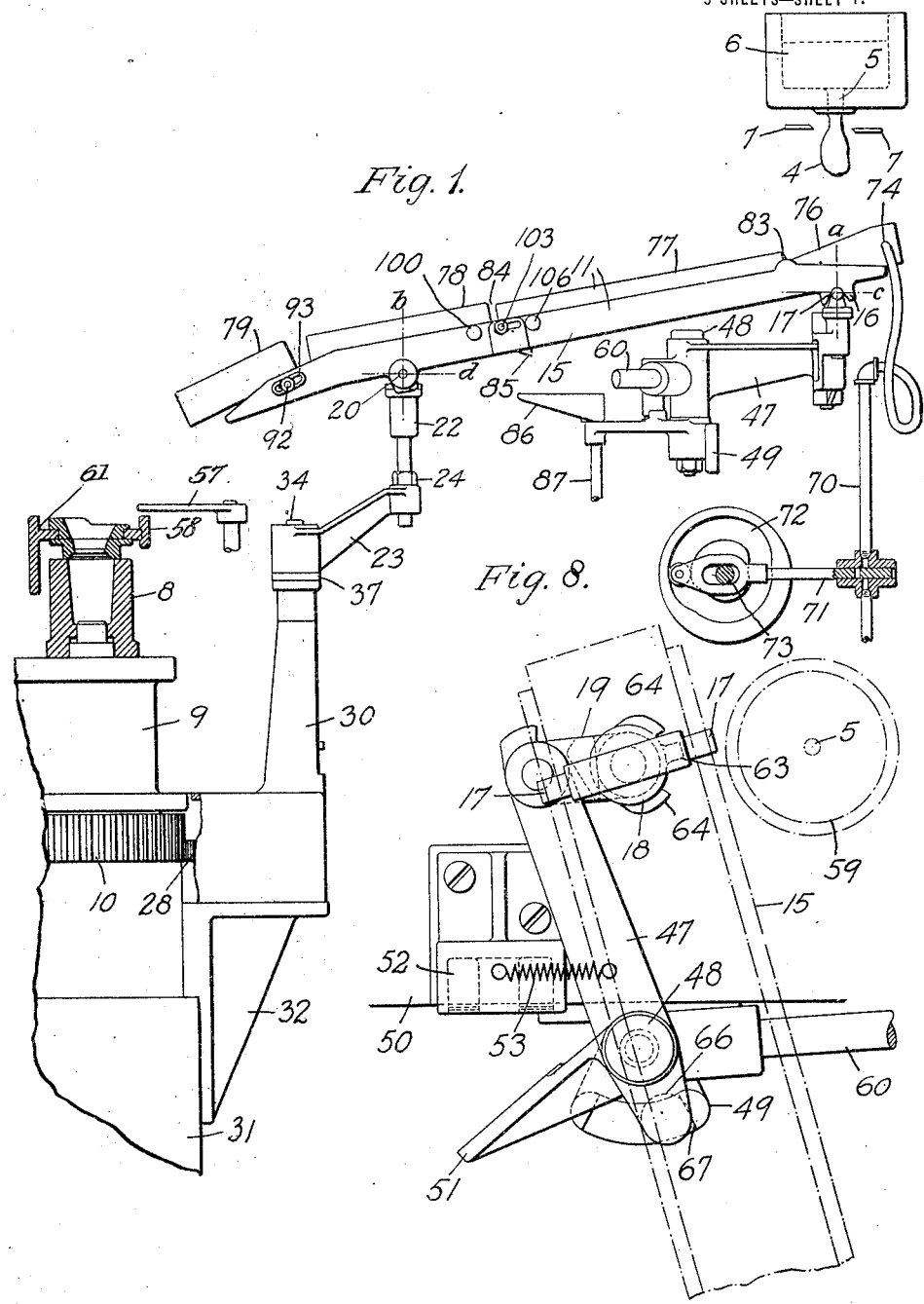
Witnesses:
S. S. Grotto
Wm. A. Zeiser
Inventor:
Karl E. Peiler
by Wm H Honiss
Atty.

K. E. PEILER.
GLASS CONVEYING APPARATUS.
APPLICATION FILED MAR. 20, 1915. RENEWED JULY 18, 1917.
1,379,593.
Patented May 24, 1921.
5 SHEETS—SHEET 2.
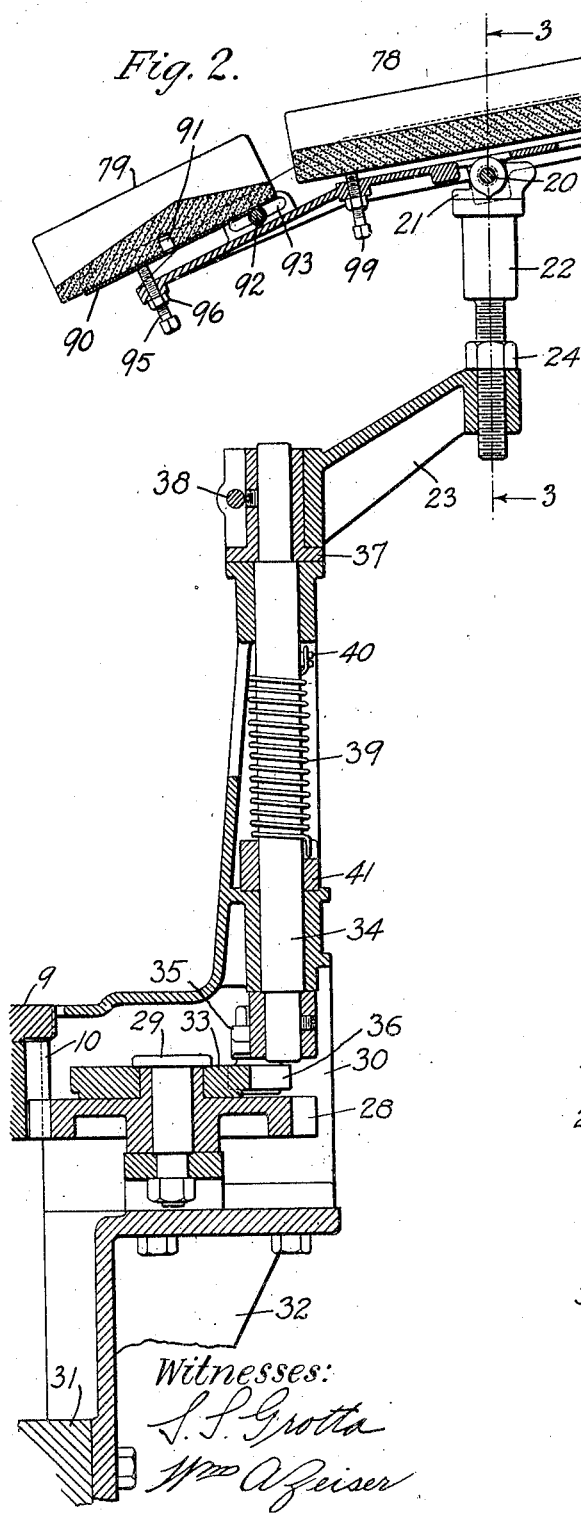
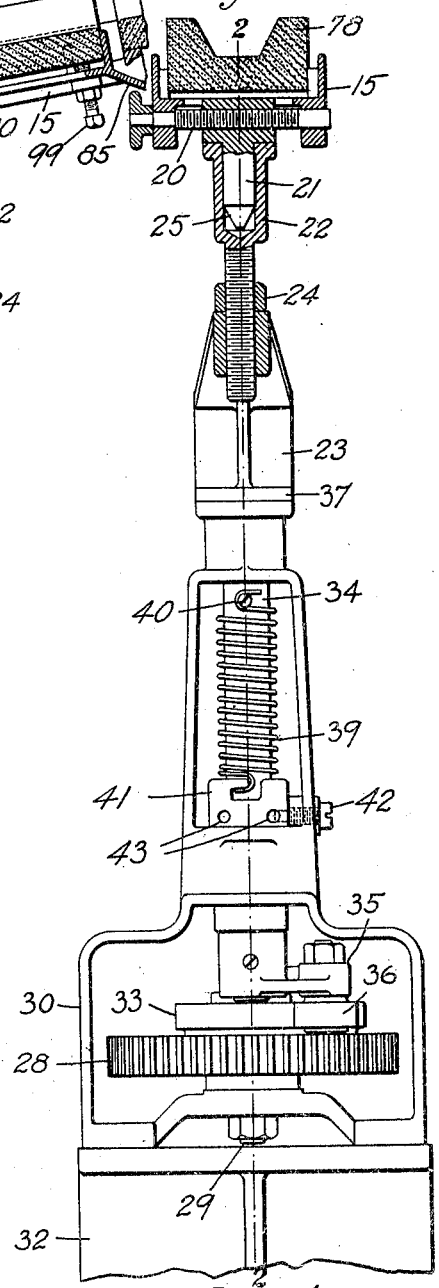
Inventor
Karl E. Peiler

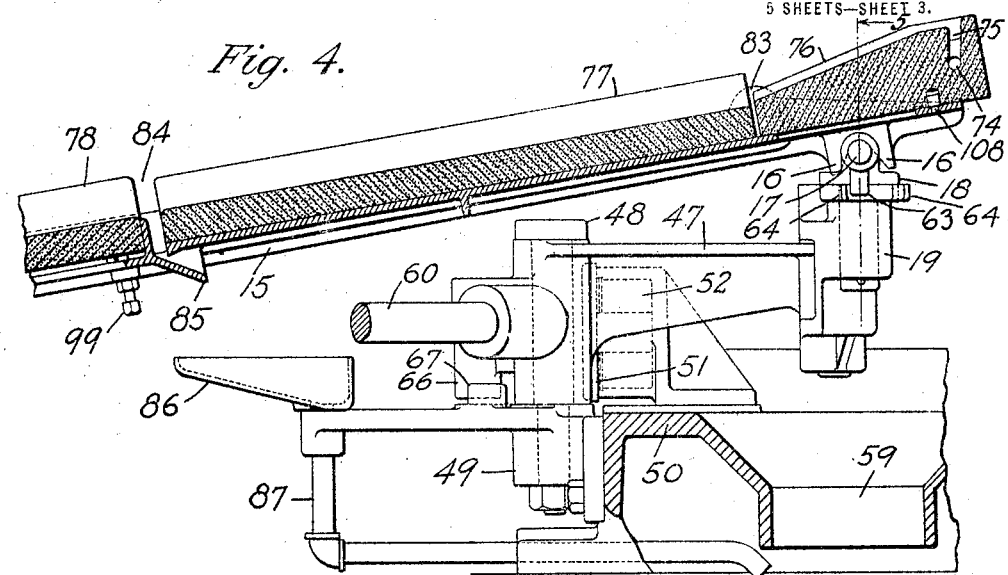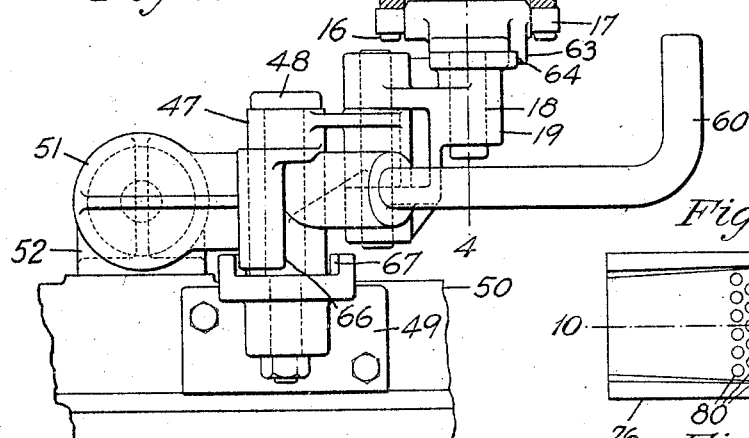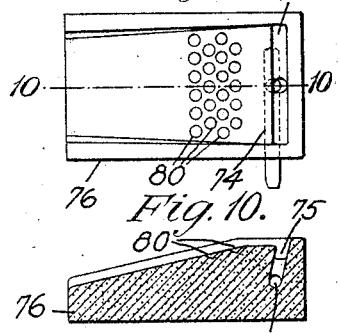

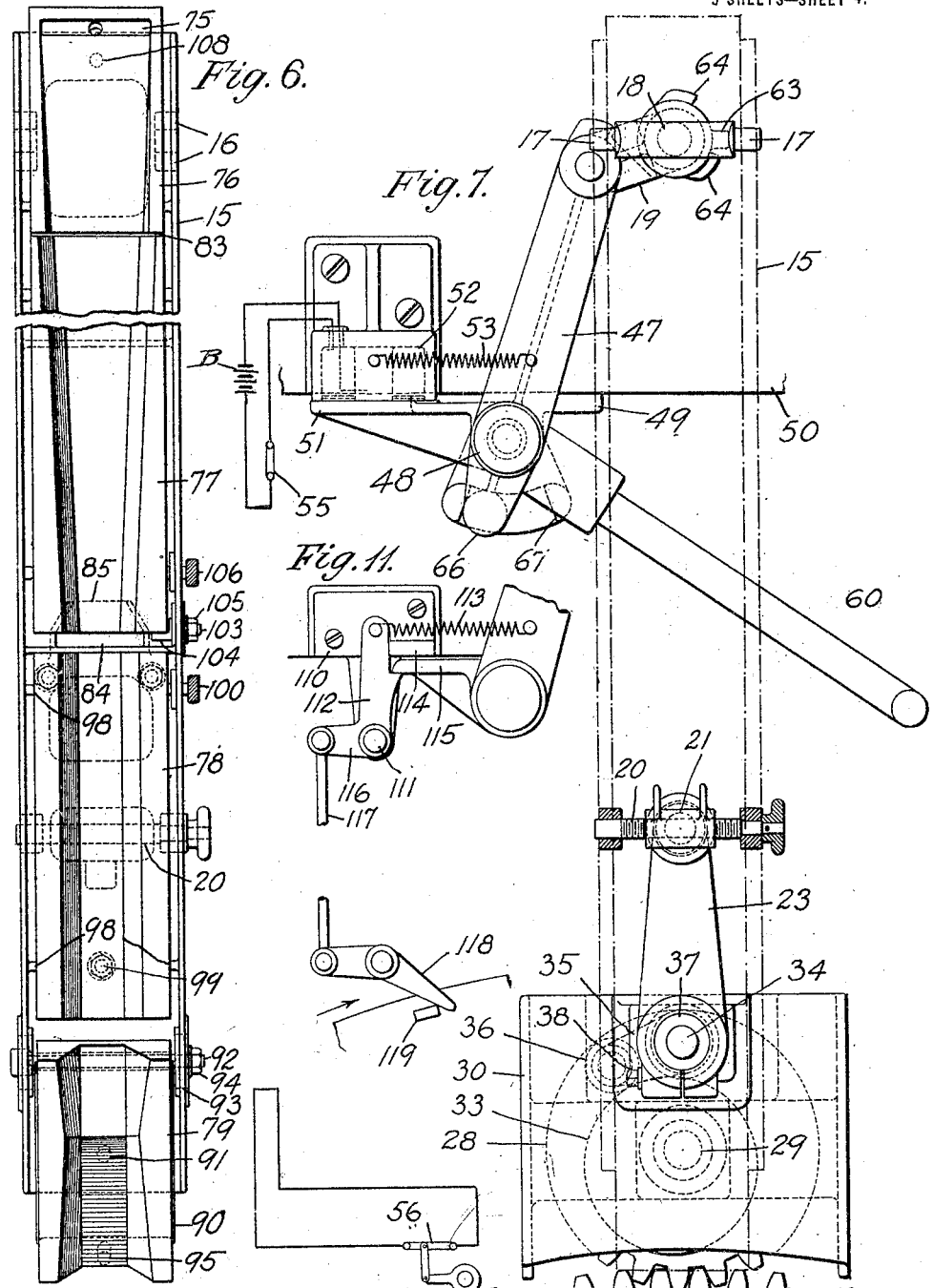

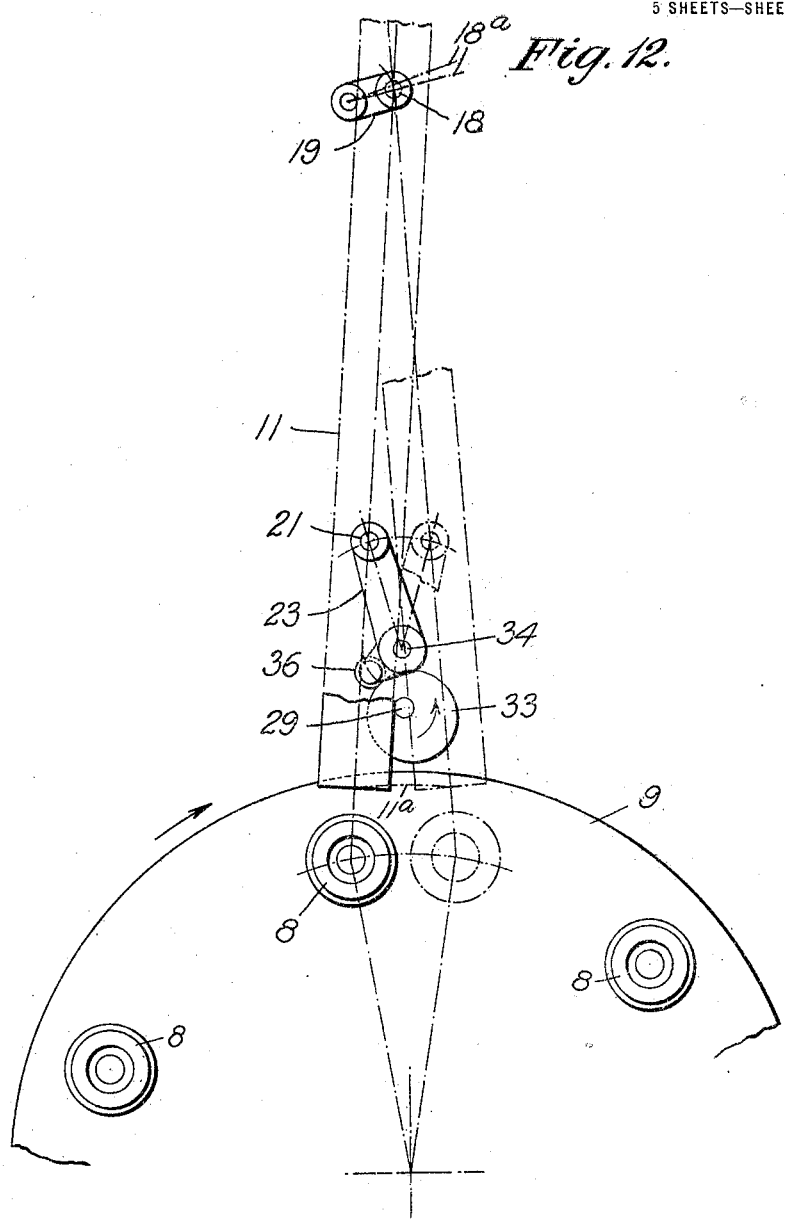

UNITED STATES PATENT OFFICE.

KARL E. PEILER, OF HARTFORD, CONNECTICUT, ASSIGNOR TO HARTFORD-FAIRMONT COMPANY, OF CANAJOHARIE, NEW YORK, A CORPORATION OF NEW YORK.

GLASS-CONVEYING APPARATUS.

1,379,593.     Specification of Letters Patent.     Patented May 24, 1921.

Application filed March 20, 1915, Serial No. 15,875. Renewed July 18, 1917. Serial No. 181,452.

*To all whom it may concern:*

Be it known that I, KARL E. PEILER, a citizen of the United States, residing at Hartford, in the county of Hartford and State of Connecticut, have invented new and useful Improvements in Glass-Conveying Apparatus, of which the following is a specification.

This invention comprises improvements in apparatus for feeding or conveying molten glass, as for example from a melting tank or furnace to a machine for pressing, blowing, or otherwise shaping the molten glass into glassware.

In the accompanying drawings, this invention is illustrated in an embodiment adapted for feeding separated gathers or charges of glass from a glass tank or furnace to the mold or molds of a glassware shaping machine. Figure 1 of the drawings is a side elevation in reduced scale, showing the general construction and arrangement of the apparatus, and its relation between the outlet of the furnace and a glass shaping mold. Fig. 2 is a side elevation in larger scale, and in section taken mainly along the line 2—2 of Fig. 3. Fig. 3 is an end elevation projected from Fig. 2 and shown partly in section taken on the line 3—3 of that figure. Fig. 4 is a side elevation showing the upper right hand portion of the apparatus of Fig. 1, the chute or conduit being shown in section taken on the line 4—4 of Fig. 5. Fig. 5 is an end elevation projected from the right hand end of Fig. 4, and shown partly in section taken on the line 5 of that figure. Fig. 6 is a plan view of the conduit shown in the previous figures. Fig. 7 is a plan view of the conduit supporting and operating mechanism, with the conduit removed, its position being, however, indicated in dot-and-dash outline. Fig. 8 is a plan view of the upper portion of the mechanism shown in Fig. 7, moved to its "out" or inoperative position. Fig. 9 is a plan view of one of the conduit sections, and Fig. 10 is a side elevation thereof, in section taken on the line 10—10 of Fig. 9. Fig. 11 is a plan view of a mechanical substitute for the magnetic latch of the previous figures. Fig. 12 is a plan view of the mechanism shown in the preceding figures, illustrating the movements of the delivery conduit.

In the installation herein shown the glass is assumed to be delivered from the outlet 5 of the throat or forehearth 6 of any melting tank or furnace. When fed in separate gathers, as intended in this instance, the suspended gathers 4 of glass may be severed by any suitable shear mechanism shown conventionally by the shear blades 7. The glass falls upon the conduit of the present apparatus, and sliding along the conduit is delivered into a receptacle or shaping mold 8, which is herein shown to be mounted upon a rotating table 9 driven by or through the gear 10. The inclined conduit structure, indicated in a general way by 11, extends from beneath the outlet 5 in a generally horizontal direction toward the mold, and is mounted for lateral movement at or near its ends. It may be mounted to slide, but is herein shown to be mounted for swinging movement on two vertical axes $a$ and $b$ (Fig. 1) the first located approximately beneath the furnace outlet 5, and the other toward the lower end of the conduit, thus enabling either of its ends to be swung laterally on an axis located adjacent to its other end. The lower end of the conduit is thus swung on the axis $a$ to carry it in suitable delivering alinement to the traveling mold 8, while delivering a charge or gather of glass thereto, swinging back and forth in similar relation to successive molds revolving with the table. The upper end of the conduit is swung aside on the axis $b$ whenever it may be desired to stop the glass shaping machine, or discontinue feeding the glass thereto, the glass so long as it continues to be discharged from the outlet being thus allowed to fall past the side of the conduit into a cullet pit or car 12, or other suitable receptacle, either directly, as here shown, or upon another chute, conveyer, or conduit, for conveying the glass to a cullet receptacle.

Following this brief description of the apparatus, a more detailed description will now be given of the embodiment of the invention illustrated in the drawings. It will be understood that this embodiment contains many refinements of construction, which although desirable for the most effective utilization of the invention, are not all necessary for practical purposes. For example, the conduit which is herein shown to be mounted upon easily swinging swivels and arms, which support the conduit as well as operate it, may be mounted at its ends to slide upon fixed supports, and be operated by connections which are independent of the supports.

The supporting frame 15 for the conduit is herein shown to be a casting provided with pivotal supports, enabling it to be swung horizontally at either end upon the vertical axes $a$ and $b$, or vertically upon the horizontal axes $c$ and $d$, Fig. 1, the vertical swing enabling the general level of the conduit to be adjusted to regulate the rapidity of flow, or to suit the position or the heights of the molds to which the glass is delivered. To turn upon the axis $c$, the frame 15 is provided with inverted V bearings 16, resting upon the trunnions 17, which extend from the sides of the swivel 18, supported on and journaled in the rocker arm 19, upon which the swivel 18 turns coincidently with the axis $a$.

A somewhat similar double swiveling connection at the axes $b$ and $d$ between the conduit and its support is made by the screw 20, the ends of which are journaled in lugs of the frame 15 (Fig. 3). The intervening length of the screw is threaded transversely through the top of the swivel 21, the center line of which is coincident with the axis $b$, and is journaled in the socket 22, the lower end of which is threaded through the cranked operating arm 23, and thus serves as a crank pin for swinging the lower end of the conduit around the axis $a$. The threaded connection between the stud or crank pin 22 and the crank arm 23 enables the lower end of the conduit to be adjusted to the proper height, at which it is locked by the nut 24. The swivel 18 supporting the upper end of the conduit may be similarly adapted for vertical adjustment.

The operating arm 23 is moved back and forth, to swing the lower end of the conduit in proper time relation to the molds, by the cam mechanism, driven by or with the revolving mold table 9. In this instance the spur gear 10, carried by the table, drives a smaller gear 28 mounted on a stud 29 carried by the column or standard 30, which may as here shown be attached to the base or frame 31 of the glass shaping machine in any convenient way, as by the bracket 32. Attached to the gear 28 is a cam 33, the peripheral edge of which is employed for rocking the vertical shaft 34, carrying the crank arm 23. That shaft is journaled in the standard 30 and has fixed to its lower end a cam arm 35 engaging with the cam 33, preferably by means of a friction roller 36. The upper end of the shaft 34 has fixed upon it a bushing 37, which in this arrangement is employed to support the weight of the shaft, and to this bushing the crank arm 23 is clamped by means of the clamp screw 38, so that the arm may be adjusted to register the conduit in delivering alinement with the molds. Obviously the crank arm 23 might be clamped directly upon the shaft 34. The cam 33, which may be either of the open or of the closed type, is herein shown to be an open cam; and the cam arm is made to follow the cam by means of the torsional spring 39, one end of which is secured to the shaft by the screw or pin 40, and the lower end of which is connected to the loose collar 41, which may be adjusted around the shaft to vary the torsional tension of the spring, and be held in adjusted position by the screw 42 entering one of the holes 43. In Fig. 12 is shown an illustration of the swinging movement of the conduit 11, imparted by the arm 23, whereby the conduit in addition to being given a lateral swinging movement also has an endwise component of movement, the extent of which is indicated by the lines 18$^a$ The resultant movement at the delivering end of the conduit is represented by the arc 11$^a$, which is closely, if not exactly, parallel with the arc of travel of the molds 8, thus illustrating that the delivery end of the conduit is maintained in uniform relation to the molds 8, both laterally and longitudinally. while traveling with and delivering glass to the molds.

The proportions of the gears 10 and 28 are such as to cause the cam 33 to rotate once for each mold carried on the table, thus repeating its movements, and consequently the swinging movements of the lower end of the conduit once for each successive mold. The conduit is thus carried in delivering alinement to each mold, as it passes, and is then retracted into similar alinement to the succeeding mold. It will be understood that the movements of the mold, the conduit, and whatever means may be employed for conveying the successive charges of molten glass from the furnace to the conduit, will be adjusted and regulated in proper time relation to each other.

The rocker arm 19, on which the upper end of the conduit rests, (Figs. 4 and 5) also forms a connecting rod between the swivel and its operating arm 47, by means of which the upper end of the conduit is supported and swung upon the axis $b$ between the operative and inoperative positions shown in Figs. 7 and 8, respectively. That arm is pivotally supported on the stud 48, fixed to the bracket 49, which is secured to any convenient portion 50 of the glass furnace, or its feeding mechanism. The conduit is held in operative position by a latching device, which may be of a mechanical type, of which an example is shown in Fig. 11, or of a magnetic, illustrated in the other figures, in which a projecting wing 51 of the operating arm serves as an armature in conjunction with an electro-magnet 52, which is also secured to any convenient fixed support, in this case the base or frame 50. Or the magnet may be carried by the arm 47 and the armature be fixed. When moved to its operative position of Fig. 7, the conduit is yieldingly retained there by the influence of the energized magnet upon the armature 51. A spring 53 connecting the magnet housing with the operating arm 47 serves to pull that arm and the armature from the position shown in Fig. 7 to the inoperative position of Fig. 8, when the armature is released by the deënergizing of the magnet, or is forcibly pulled away from the influence of the magnet to stop the delivery of glass along the conduit. The magnet is energized through an electric circuit 54, having suitable switches or circuit breakers 55 disposed at points from which it may desirable or convenient to operate the magnet, and stop the delivery of glass by the conduit. One of the switches 56 of this circuit is connected as shown in Figs. 1 and 7, with an automatic stop device. An arm 57 connected with the switch 56 is disposed in the pathway of a dog or tappet 58 attached to some portion of the revolving shaping mechanism, in such a way that the tappet will clear the arm 57 when operating normally, as shown in Fig. 1, but will collide with the arm in case of abnormal position or operation. As illustrated in Fig. 1, the tappet 58 is shown to be attached or appurtenant to the mold ring yoke or slide 61, which if carried down to its normal position upon the mold passes beneath the arm 57 without operating it. But if the mold ring for any reason should fail to close down upon the mold, the tappet would collide with the arm 57, thus breaking the circuit, deënergizing the magnet, and allowing the conduit to be moved by its spring to its inoperative position of Fig. 8. While in this position, charges or gathers of glass which may continue to be delivered from the outlet 5 will fall past the conduit into a funnel shaped opening 59 in the base, leading to a cullet pit, car, or other receptacle in or beneath the base of the machine.

Other switches in the same circuit may be similarly disposed adjacent to other parts of the machine, to be similarly opened by the failure of any of those parts to work normally.

As a means for manually swinging the conduit, the operating arm 47 is shown to be provided with a handle 60, which should be disposed in convenient relation to the position from which it will be found most convenient to operate it in any given installation. Where the operator's position is out of arm's reach, a suitable connection may be made from the arm 60 to the operator. It will usually be found desirable and convenient to have such a connection extending within reach of the operator of the associated shaping machine, thus making it easy for him to move the conduit manually whenever he so desires. The handle and the described connection may be used independently of the magnet circuit breakers, for moving the conduit away from its operative position, forcibly overcoming the holding effect of the magnet, the strength of which may be regulated to permit being thus forcibly overcome.

The entire conduit may easily be lifted off and replaced upon its swiveling supports. The swivel 21 being attached to the screw 20 is lifted out of its socket, the lower end of the swivel being chamfered at 25 to facilitate replacing it. At its upper end the inverted V's lift away from the trunnions of the swivel 18, and to prevent the swivel from swinging too far beyond its working range of movement while the conduit is thus removed, the swivel is provided with a depending lug 63 extending between the shoulders 64 of the rocker arm 19 (Figs. 4, 5, 7 and 8). These shoulders, while permitting the swivel to swing through its working range of movement, serve while the conduit is removed, to retain the swivel in position for receiving the inverted V's of the chute when the latter is again replaced.

A stop is also provided for limiting the swinging movement of the operating arm 47, shown in Figs. 5, 7 and 8, when drawn aside by the spring shown in Fig. 8. This stop consists of a lug 66, which extends downwardly from the operating arm in front of a shoulder 67, projecting upwardly from the bracket 49.

The conduit frame 15 may itself be adapted for use as a channel or conduit along which the glass may be conveyed to the mold; or it may, as herein shown, be used as a frame or holder for containing a removable channel or lining, of material suited for the intended purpose. As illustrated herein, it is adapted to receive sectional linings which are separably adjustable, thus forming what may be termed an articulated conduit, whereby in addition to adjusting the general level or inclination of the conduit as a whole, the different sections thereof may be separately adjusted, so as to obtain different degrees of inclination at different portions of the length of the conduit, as well as to adjust the relative heights and distances apart of the different sections, to regulate the trajectory or the rapidity of travel of the glass, or to regulate the flow, distribution and escape of any lubricating fluid or liquid that may be employed.

The upper portion of the conduit is made wide enough to receive the largest charge of glass which may be fed to it. Toward the delivering end of the mold the sides of the chute are made converging to the extent required for narrowing and thus shaping the charge into an elongated form of suitably compact cross-section to insure its proper delivery into the mold. Thus the charge may be narrowed and elongated to any desired extent to suit the shaping mold to which it is delivered. The elongation of the charge also overcomes any tendency for it to turn end for end, and insures its more accurate drop or flight into the mold.

When made in separate sections, as herein shown, the entering end of the channel of each section should be a little wider and lower than the delivering end of the preceding section, thus avoiding any tendency of the glass to catch in entering the respective sections.

To facilitate starting each charge quickly on its sliding movement along the conduit, the receiving end of the conduit should be more steeply inclined than may be necessary for the succeeding portions. The delivery end of the conduit should also be somewhat steeply inclined, or susceptible of steep inclination, so as to give final impulse and guidance to the charge as it leaves the chute, especially when the general level of the conduit is only slightly inclined from the horizontal.

In the embodiment herein illustrated, the sectional linings are preferably made of carbon or similar resistant and porous material. The character of such material better enables its surface to hold and distribute a protecting film of the water or other fluid, which is caused to flow from the upper end of the conduit downwardly far enough to insure a proper lubrication of the glass conveying surface of the conduit. The use of separate sections and their capacity for adjustment both lengthwise and vertically enable them to be disposed to best advantage to suit the flow, both of the glass and of the lubricating fluid. The separation between the sections enables any desired quantity or proportion of the fluid to be discharged at the respective joints. It will seldom if ever be found necessary to cause the fluid to flow the entire length of the conduit, inasmuch as sufficient fluid will be carried along by the glass from the upper to the lower portions, without otherwise providing for a definite flow of the fluid to those sections. In the embodiment herein described, the definite flow of fluid is diverted at one of the intermediate joints of the conduit.

The fluid, which may be water, is herein shown to be conducted to the conduit from a pipe 70, in which is located a valve 71 periodically opened and closed by a cam 72, which may be located on a shaft 73 of the associated feeding or shaping mechanism. In this way, the flow of water is delivered periodically to the surface of the chute, just as, or just before, each charge of glass falls upon it, thus conserving and making best use of the water supply.

The water enters the inlet 74 leading to a distributing channel 75, extending practically across the upper portion of the conduit, above the surface on which the glass is delivered. Overflowing the lower edge of this channel, the water passes down the inclined surface of the conduit block 76, that surface being preferably provided with rows of distributing depressions 80, which are disposed in staggered formation across the surface of the conduit. These depressions are preferably circular, and are most conveniently made with a drill, the V-shaped lips of which are sunk into the surface up to their edges. These depressions serve to further distribute the flow of water evenly across the conduit surface. The surface of this first block or section 76 is preferably more steeply inclined than the other, to give the glass a quicker initial downward impulse or deflection. For the same purpose, and also to insure more complete distribution of the water on this surface, which receives the repeated impacts of the glass, more water is flowed down it than is usually needed upon the subsequent sections. Hence some of the water may be allowed to escape through the interval or interruption 83 between the first two sections 76 and 77. The next interval 84, or some succeeding joint between the sections is made or adjusted wide enough open to allow most of the supply of water reaching that interval to be deflected through it, running down the deflector or apron 85 and falling into a collecting pan 86, the bottom of which drains through a pipe 87 leading to the cullet pit or car 12, as best shown in Fig. 4. Suitable grooves or gutters for leading the water from the joints to the apron 85 are provided in the floor or sides of the frame 15. A sufficient amount of the water will, however, have been picked up or carried across the joints by the sliding glass, to lubricate the glass or the succeeding sections, and the amount thus carried across may be regulated by adjusting the sections 77 and 78 together or apart, thus closing or opening the interval 84 to the required extent.

The glass slides so easily along the conduit, especially when lubricated as above described, that the conduit may be extended a considerable distance at a very moderate inclination from the horizontal. When thus disposed, it is found desirable to provide a fairly long range of tilting adjustment to one or both of the terminal sections 78—79, to aid in determining and uniformly maintaining the trajectory through which the charges of glass are projected into the mold. These adjustments may be made while the machine is in operation, during the halts that occur, or that may be provided at the reversals of its swinging movements, the operator being thus enabled to observe the progressive effect of his adjustments. The lower end or section 79 is preferably more steeply inclined than the others, to give a final uniform gravity impulse to the passing charges. For this purpose this section is supported upon a plate 90 having one or more studs 91, which in effect dowel the block to the plate. The upper end of the plate is turned around the pivot rod 92, the ends of which slide in the slots 93, being fastened to place when adjusted by means of a nut 94, upon the end or ends of the rod, leaving the plate 90 and its section 79 of the conduit free to swing upon that rod. Its vertical swinging position is regulated by the adjusting screw 95, secured in place by a lock nut 96.

The section 78 rests in the frame 15 between guiding ribs 98 of the frame 15, and is clamped in place by the screw 100. Its ends are adjusted vertically by means of the screws 99 to adjust it to different degrees of inclination, and to adjust the levels of its ends into suitable conformity or relation to the levels of the adjacent sections. Generally as here shown it will be found desirable to dispose the receiving end of each section a little below the delivering end of the next higher section, as shown in Figs. 2 and 4.

The section 77 rests upon the bottom of the frame 15, as shown in Fig. 4. No vertical adjustment for this section is shown, but obviously it may be so adjusted, if found desirable, like the other sections. This section is, however, shown to be adjustable endwise, by means of a bolt 103 extending through the slot in the side of the frame 15, the head 104 of the bolt extending behind the lower end of the section, as shown in Fig. 6, the bolt being clamped to place when adjusted by means of the nut 105. This endwise adjustment may be applied to any of the sections to increase or lessen the intervals between the sections, thus regulating the proportions of the water released at these intervals. Additional screws 106 may be used for clamping the sections to place at their adjusted positions.

The upper section 76 rests upon the bottom of the frame, being located by means of a dowel 108. Obviously, however, this section may be arranged for vertical or lengthwise adjustment, like any of the other sections, if desired.

The flexibility and range of adjustment of the conduit, both generally and locally, makes the conduit an important factor in regulating the time of transit of the charges of glass, as well as determining and maintaining a desired trajectory of the glass from the conduit into the mold. This flexibility of adjustment may be utilized as an important factor in the timing of the machine, and the control of the working conditions of the glass. Hotter glass may be given longer time in transit along the chute, and vice versa.

The lubricating fluid flowing with comparative slowness along the conduit surface and having little or no momentum, flows or falls into the joints or interruptions in the surface provided for the purpose of thus deflecting the main body of the fluid where desired; whereas, the charges of glass sliding freely upon the surface of the fluid with a uniform minimum of frictional resistance, loses comparatively little of its initial or acquired momentum, which carries it freely and smoothly across the joints or interruptions in the conduit surface, even when the latter is only slightly inclined from the horizontal.

Inasmuch as the functions of the various parts have been described in connection with the description of their construction, only a brief résumé of their general mode of operation seems here required. The various parts of the machine having been adjusted as described so as to produce a proper flow of the glass at the proper velocity and through the desired trajectory into the successive molds, the machine is started. The lower end of the conduit travels forward in alinement with each mold, while delivering the glass thereto, and then swings back again into similar register with the succeeding mold. The feeding thus goes on automatically, in time with the operations of the press. The stop switches or circuit breakers having been located wherever any possibility of failure or of abnormal working may be expected, will upon such failure or abnormal operation deenergize the magnet and by thus releasing the armature permit the upper end of the conduit to be swung aside to its inoperative position shown in Fig. 8. The same circuit may be combined with or included in an electric circuit for similarly stopping the operation of the feeding machine or of the press itself, or with both of these. In some cases, however, it may be expected that the molten glass will still continue to be delivered from the tank or the feeding apparatus, which by this provision will be diverted to a cullet pit or car, instead of being delivered along the conduit to the pressing machine, thus adding to the original troubles.

When those troubles are remedied and the press is ready to start again, the upper end of the conduit is swung back to its working position of Fig. 7, by means of the handle 60, which for this purpose may be provided with a connecting rod extending to the operator's station at the press.

It will be found very convenient to thus put the conduit out of operation while adjusting and regulating the glass feeding mechanism. Ordinarily, when the glass feeding mechanism is started, some time is required to get the glass and its feeding mechanism into proper working condition, so as to feed the glass in charges of the required size, and plastic condition, with the necessary certainty and regularity. Until such normal conditions are established at the glass feeding machine, the conduit may remain in its inoperative position, and be brought into its operative position only when proper working conditions of the glass, the feeding machine and the press have been established.

The horizontal swinging rocker arm 19, pivoted to the arm 47, allows free swinging movement of the conduit upon either of its axes $a$ or $b$, permitting the horizontal distance between those axes to adapt itself to the changes that may be made in the inclination of the conduit. Obviously this arm, or a similar rocker arm, might be applied to the arm 23 instead of the arm 47.

The construction herein shown and described may be modified by reversal or inversion or substitution of equivalent parts in ways well understood by those skilled in the art, without departing from the invention as defined in the claims.

A mechanical modification of the latching device is shown in Fig. 11. A bracket 110, substituted for the magnet 52, pivotally supports at 111 a latch 112 yieldingly held in its closed position by the spring 113, the other end of which may be attached to the operating arm, and thus serve also the function of the spring 53. A lug or pin 114 on the bracket 110 may serve as a stop for the latch 112, and also for the latch arm 115, which may be substituted for the armature 51 of the operating arm 47. The bell cranked arm 116 of the latch is connected by a rod 117 with a bell cranked arm 118, which may be substituted for the switch arm 57 of Fig. 8, and be similarly operated by the incomplete or abnormal operation or position of a member, as 119, of the machine. When operated, the arm 118 through its connections withdraws the latch 112 and releases the arm 115, thus allowing the conduit to be moved to its inoperative position.

I claim as my invention:—

1. Apparatus for conveying molten glass, including means for delivering the glass, and a conduit mounted for lateral movement at different portions of its length independently of each other.

2. Apparatus for conveying molten glass, including means for delivering the glass, and a conduit, and a plurality of independent means for swinging the conduit at different portions of its length.

3. Apparatus for conveying molten glass, including means for delivering the glass, and a conduit supported at different portions of its length for independent swinging movement.

4. Apparatus for conveying molten glass, including means for delivering the glass, and a conduit mounted for swinging movement on a plurality of horizontal axes.

5. Apparatus for conveying molten glass, including means for delivering the glass, and a conduit mounted for swinging movement on a plurality of substantially vertical axes, and also on a plurality of horizontal axes.

6. A conduit supported for lateral movement, means for laterally moving the ends of the conduit independently of each other, means for laterally moving one end of the conduit in a prescribed way, means for delivering molten glass to the conduit, and means for yieldingly preventing the lateral movement of the other end of the conduit.

7. A conduit mounted on supports for swinging the ends of the conduit independently of each other, means for swinging one of the supports to carry one end of the conduit in delivering alinement to a moving receptacle, means for delivering molten glass to the conduit, and means for yieldingly preventing the swinging movement of the other end of the conduit.

8. The combination with an outlet for molten glass, and with a traveling receptacle for the glass, of a conduit extending in a generally horizontal direction from beneath the outlet toward the path of the traveling receptacle, means for moving the delivering end of the conduit in delivering relation to the receptacle, and other means for moving the receiving end of the conduit away from beneath the outlet.

9. The combination with an outlet for molten glass, and with a traveling receptacle for the glass, of a conduit extending in a generally horizontal direction from beneath the outlet toward the path of the receptacle, means for moving the delivering end of the conduit in regular time with the receptacle, and means for moving the receiving end of the conduit at will from beneath the end of the outlet.

10. The combination with an outlet for molten glass, and with a plurality of traveling receptacles for the glass, of an inclined conduit extending from beneath the outlet downwardly toward the path of travel of the receptacles, means for moving the lower end of the conduit in regular time relation to the succeeding receptacles, and means for moving the upper end of the conduit at will, from beneath the outlet.

11. Apparatus for conveying molten glass, including means for delivering a supply of the glass, a conduit extending in a generally horizontal direction, and swiveling supports on which the conduit is mounted to swing its opposite end portions independently of each other.

12. The combination of an inclined conduit, means for delivering molten glass to the conduit, operating arms for swinging the opposite end portions of the conduit independently of each other, and swiveling connections between the said arms and the conduit.

13. In apparatus for conveying molten glass, the combination of an inclined conduit, means for delivering molten glass to the conduit, and means for supporting and swinging the opposite ends of the conduit independently of each other, including swiveling connections supporting the chute for swinging movement on a plurality of axes.

14. In apparatus for conveying molten glass, the combination of an inclined conduit, means for delivering molten glass to the conduit, and means for supporting the conduit for swinging movement on a substantially horizontal axis and on a substantially vertical axis.

15. The combination in apparatus for conveying molten glass, of an inclined conduit, means for delivering molten glass to the conduit, and means supporting the conduit for swinging movement to swing each of its ends both horizontally and vertically.

16. The combination, in apparatus for conveying molten glass, of an inclined conduit, means for delivering molten glass to the conduit, operating arms supporting the conduit to swing its opposite ends independently of each other, and means for adjusting the inclination of the conduit.

17. The combination, in apparatus for conveying molten glass, of an inclined conduit, means for delivering molten glass to the conduit, operating arms supporting the conduit to swing its opposite ends independently of each other, swiveling connections between the said arms and the conduit, and means for varying the inclination of the conduit on its supports.

18. The combination, in apparatus for conveying molten glass, of an inclined conduit, means for delivering molten glass to the conduit, an operating arm supporting the conduit for lateral swinging movement at one of its ends, and means for adjusting the conduit laterally with relation to its operating arm to move the range of its swinging movement.

19. The combination, in apparatus for conveying molten glass, of a moving receptacle for the glass, a conduit inclined downwardly toward the receptacle, an operating arm for moving the lower end of the conduit in operative relation to the traveling receptacle, and means for adjusting the conduit laterally relative to the operating arm.

20. The combination, in apparatus for conveying molten glass, of a moving receptacle for the glass, a conduit inclined downwardly toward the receptacle, an operating arm for moving the lower end of the conduit in operative relation to the traveling receptacle, and means for adjusting the lower end of the conduit both vertically and horizontally.

21. The combination, in apparatus for conveying molten glass, of a conduit, means for delivering the glass to the conduit, supporting arms for swinging the ends of the conduit independently of each other, and separable connections between the conduit and its supporting arms, upon which the conduit rests by gravity, whereby the conduit may be removed from its supporting arms by lifting it away from its support.

22. In apparatus for conveying molten glass, the combination of means for delivering the glass, a conduit, the glass conveying surface of which is generally inclined, with a greater degree of inclination at its glass receiving end, and means for varying the inclination at the glass delivering end.

23. In apparatus for conveying molten glass, the combination of means for delivering the glass, a conduit having a generally inclined glass conveying surface, the inclination of which is greatest at its receiving and delivering ends, and means for varying the inclination at the delivering end.

24. In apparatus for conveying molten glass, the combination with means for delivering the glass, of a conduit having a glass conveying surface, the receiving and delivering portions of which are inclined relative to the intermediate portion, and means for varying the inclination at the delivering end.

25. In apparatus for conveying molten glass, the combination with means for delivering the glass, of a conduit having a trough-like conveying and guiding surface, the bottom of which is inclined at differing degrees, and the sides of which converge from the glass receiving end toward the other end.

26. In apparatus for conveying molten glass, the combination with means for delivering the glass, of an articulated conduit composed of separately adjustable sections.

27. In apparatus for conveying molten glass, the combination with means for delivering the glass, of an articulated conduit made in separately adjustable sections, and adjustable supporting means for the conduit whereby its general inclination may be changed.

28. In apparatus for conveying molten glass, the combination with means for delivering the glass, of an articulated conduit having separately adjustable sections, and an adjustable support for the conduit as a whole, whereby the conduit may be adjusted both generally and locally.

29. In apparatus for conveying molten glass, the combination with means for delivering the glass, of an articulated conduit composed of separately adjustable sections, and means for supporting the sections collectively and adjusting them as a whole, without affecting their relative adjustment.

30. The combination with means for delivering molten glass, of conduit apparatus for conveying the glass, including a frame, separable conduit sections supported in the frame, and means for adjusting the sections independently.

31. Conduit apparatus for conveying molten glass, including a supporting frame, separable conduit sections supported in the frame for adjustment relative to each other, and means for swinging the frame to carry the sections collectively.

32. The combination with means for delivering molten glass, of conduit apparatus for conveying the glass, including an inclined frame, separable conduit sections supported by the frame, and independently adjustable thereon relative to each other, and means for adjusting the inclination of the frame to adjust the sections collectively.

33. In apparatus for conveying molten glass, the combination of a conduit extending in a generally horizontal direction, and means for supplying a timed intermittent flow of lubricating fluid to the conduit surface.

34. In apparatus for conveying molten glass, the combination of a conduit extending in a generally horizontal direction, means for flowing a timed intermittent supply of lubricating fluid upon the conduit, and means for distributing the flow of fluid across the conduit.

35. In apparatus for conveying molten glass, the combination of an inclined conduit, and means for intermittently flowing a lubricating film of fluid upon the surface of the conduit from a higher to a lower level.

36. In apparatus for conveying molten glass, the combination of an inclined conduit, means for flowing a lubricating film of fluid upon the surface of the conduit from a higher to a lower level, and means for distributing the fluid across the conduit surface, including a plurality of depressions disposed across the conduit surface.

37. In apparatus for conveying molten glass, the combination of an inclined conduit, means for flowing a lubricating film of fluid upon the surface of the conduit from a higher to a lower level, and means for distributing the fluid across the conduit surface, including a plurality of depressions disposed in a staggered relation.

38. In apparatus for conveying molten glass, the combination of an inclined conduit, means for flowing a lubricating film of fluid upon the surface of the conduit from a higher to a lower level, and means for distributing the fluid across the conduit surface, including a plurality of depressions disposed in a staggered relation across the inclined conduit surface, the lower depressions being arranged opposite to the spaces between the upper depressions.

39. In apparatus for conveying molten glass, the combination of an inclined conduit, means for flowing a lubricating film of fluid upon the surface of the conduit from a higher to a lower level, and means for distributing the fluid across the conduit surface, including a plurality of rows of depressions extending across the inclined conduit surface, the width of the depressions being greater than the spaces between them, and the depressions of one row being arranged opposite the spaces of another row.

40. In apparatus for conveying molten glass, the combination of an inclined conduit, means for supplying a flow of lubricating fluid to the conduit, and means for distributing the flow across the conduit surface, including a channel extending across the conduit, and a plurality of depressions in the inclined conduit surface, below the channel, whereby the fluid overflowing the edges of the channel flows into and is further distributed by the depressions.

41. In apparatus for conveying molten glass, the combination of an inclined conduit composed of sections adjustably mounted relative to each other, means for flowing a supply of fluid along the conduit surfaces of the sections, and means for adjusting the sections to vary the spaces between them to regulate the release of the fluid at the joints between the sections.

42. In apparatus for conveying molten glass, the combination of an inclined conduit composed of adjustably supported sections, means for flowing a supply of fluid along the conduit surfaces of the sections, means for adjusting the sections toward and from each other to regulate the release of the fluid between the sections, and means for collecting and conducting the released fluid away from the conduit.

43. In apparatus for conveying molten glass, the combination of an inclined conduit, means for supplying luricating fluid to a higher portion of the conduit whereby the fluid flows to a lower portion, and means for diverting the flow of the fluid before it reaches the end of the conduit.

44. In apparatus for conveying molten glass, the combination of an inclined conduit, and means for flowing a supply of fluid along the conduit, the conduit surface being interrupted to divert the flow of fluid and prevent it from reaching the end of the conduit.

45. In apparatus for conveying molten glass, the combination of an inclined conduit, and means for supplying a flow of fluid, the continuity of the conduit surface being interrupted to divert regulated amounts of the fluid before it reaches the end of the conduit.

46. In apparatus for conveying molten glass, the combination of an inclined conduit, and means for supplying a flow of liquid to the inclined conduit surface, the continuity of the conduit surface being interrupted at intervals to successively release portions of the liquid at the said interruptions.

47. In apparatus for conveying molten glass, the combination of an inclined conduit, composed of adjustable sections, means for supplying a timed intermittent flow of water to the inclined conduit, and means for adjusting the sections toward and from each other, to release regulated amounts of the fluid in succession at the respective joints between the sections.

48. The combination, in feeding and conveying apparatus for conveying molten glass, of an outlet for the molten glass, a cullet receptacle located below the outlet, and a conduit movable into position to intercept the glass fed from the outlet and conduct it away, and movable away from that position to allow the glass to fall into the cullet receptacle.

49. The combination, in apparatus for feeding molten glass, of an outlet for the glass, a cullet receptacle located below the outlet, a conduit mounted for swinging movement into operative position to receive the glass fed from the outlet and conduct it away, whereby the conduit may be swung aside to discontinue its conducting function, and allow any continuing flow of glass from the outlet to fall into the cullet receptacle.

50. The combination, with an outlet for molten glass, of a cullet receptacle disposed below the outlet, a conduit movable into and out of operative position beneath the outlet, means to intercept the glass delivered from the outlet, and conduct it away, means including a magnet for holding the conduit in its operative position, and means for moving the conduit away from its operative position when the magnetic hold is released.

51. The combination, with an outlet for molten glass, of a cullet receptacle located beneath the outlet, a conduit mounted for movement to and away from its operative position beneath the outlet in which it intercepts the glass formed upon the outlet and conducts it away, means including an electro-magnet for retaining the conduit in its operative position, an electric circuit connected with the magnet, a circuit breaker, and means for moving the conduit away from its operable position when the magnet is deënergized by the breaking of the circuit, thus discontinuing its glass conveying function and permitting any continuing flow of the glass to be delivered to the cullet receptacle.

52. The combination, with a glass shaping machine, of means for delivering charges of molten glass to the machine, means including an electro-magnet for holding the glass delivering means in operative position, and means disposed adjacent to the normal path of movement of a portion of the shaping machine, whereby the magnet is deënergized and the delivery of glass to the machine is stopped upon the abnormal operation of the machine.

53. The combination, in feeding and conveying apparatus for molten glass, of an outlet for the glass, a conduit movable into and out of position for receiving the glass from the outlet, and a latch device for holding the conduit in the said position.

54. The combination, in feeding and conveying apparatus for molten glass, of an outlet for the glass, a conduit movable into and out of position for receiving glass from the outlet, means for moving the conduit away from said position, and a latch device for holding the conduit releasably in the said position.

55. The combination, in feeding and conveying apparatus for molten glass, of an outlet for the glass, a conduit movable into and out of position for receiving glass from the outlet, yielding means tending constantly to move the conduit away from said position, and a latch device for releasably holding the conduit in said position against the tendency of its moving means.

56. The combination, with a glass shaping machine and with an outlet for a supply of molten glass, of an inclined conduit extending when in operative position from beneath the outlet toward the shaping machine to convey the glass thereto, means including an electro-magnet for holding the conduit in its operative position, an electric circuit connected with the magnet and provided with a circuit breaker disposed adjacent to the normal path of movement of a portion of the shaping machine, whereby the circuit is broken by the abnormal operation of the machine, and means for moving the conduit out of its operative position when released by the magnet.

57. The combination, with an outlet for molten glass, of a cullet receptacle below the outlet, a movable inclined conduit disposed when in operative position beneath the outlet to receive glass therefrom and conduct it away, means for flowing a supply of fluid along the conduit, and means for conducting the fluid from the conduit to the cullet receptacle.

58. Means for delivering molten glass to receptacles moving in a curved path, from a source of supply at one side of that path, including a delivery conduit mounted for sidewise and endwise movements to approximately follow the said path.

59. Means for delivering molten glass to receptacles moving in a curved path, from a source of supply at one side of that path, including a delivery conduit mounted for sidewise and endwise movements to approximately follow the said path, and means for imparting said movements.

60. Means for delivering molten glass to receptacles moving in a curved path, from a source of supply at one side of said path, including a conduit for the glass mounted for swinging movement along the said path, and for endwise movement in a direction transverse to the said path.

61. The combination, with an outlet for molten glass, of means for delivering the glass at varying distances from the outlet, including a conduit for the glass mounted for swinging movement upon an axis passing adjacent to the outlet, and mounted also for movement in a direction toward and from the outlet, and mechanism for causing such movements.

In testimony whereof I have signed my name to this specification in the presence of two subscribing witnesses this 17th day of March, 1915.

KARL E. PEILER.

Witnesses:
R. CUNNINGHAM,
H. L. HEINTZELMAN.